No. 655,584. Patented Aug. 7, 1900.
N. SCHWARTZ.
COMBINED ROLLER AND HARROW.
(Application filed Apr. 26, 1900.)

(No Model.) 3 Sheets—Sheet 1.

Witnesses
Louis D. Heinrichs
Herbert D. Lawson

Inventor
Nicholas Schwartz
By Victor J. Evans.
Attorney

No. 655,584. Patented Aug. 7, 1900.
N. SCHWARTZ.
COMBINED ROLLER AND HARROW.
(Application filed Apr. 26, 1900.)

(No Model.) 3 Sheets—Sheet 2.

Witnesses:
Harry S. Rohrer
Herbert D. Lawson

Inventor:
Nicholas Schwartz
By Victor J. Evans
Attorney

No. 655,584. Patented Aug. 7, 1900.
N. SCHWARTZ
COMBINED ROLLER AND HARROW.
(Application filed Apr. 26, 1900.)

(No Model.) 3 Sheets—Sheet 3.

Witnesses
Louis D. Heinrichs
Herbert D. Lawson

Inventor
Nicholas Schwartz
By Victor J. Evans.
Attorney

UNITED STATES PATENT OFFICE.

NICHOLAS SCHWARTZ, OF AURORA, INDIANA.

COMBINED ROLLER AND HARROW.

SPECIFICATION forming part of Letters Patent No. 655,584, dated August 7, 1900.

Application filed April 26, 1900. Serial No. 14,456. (No model.)

*To all whom it may concern:*

Be it known that I, NICHOLAS SCHWARTZ, a citizen of the United States, residing at Aurora, in the county of Dearborn and State of Indiana, have invented new and useful Improvements in a Combined Roller and Harrow, of which the following is a specification.

This invention relates to new and useful improvements in combined rollers and harrows, and it is more especially an improvement upon the roller-harrow shown and described in Letters Patent No. 639,697, granted to me December 19, 1899. Its primary object is to simplify the construction of said device and to form a harrow and its attachments upon a strip adapted to be detachably secured to a roller-frame.

The invention consists of a frame rotatably supporting a sectional or two-part roller and having a cross-strip detachably secured thereto at the rear, provided with a series of teeth arranged in pairs and connected by links to the adjusting device, one of each pair of teeth being in advance of the other and both teeth having pivoted and adjustable shovel attachments on the lower ends, provided with springs, whereby said extensions have a backward-yielding movement and are adapted to pass rigid obstructions without injury to the several teeth.

The invention also consists in the further details of construction and combination of parts hereinafter more fully described and claimed and illustrated in the accompanying drawings, showing the preferred form of my invention, and in which—

Figure 1:
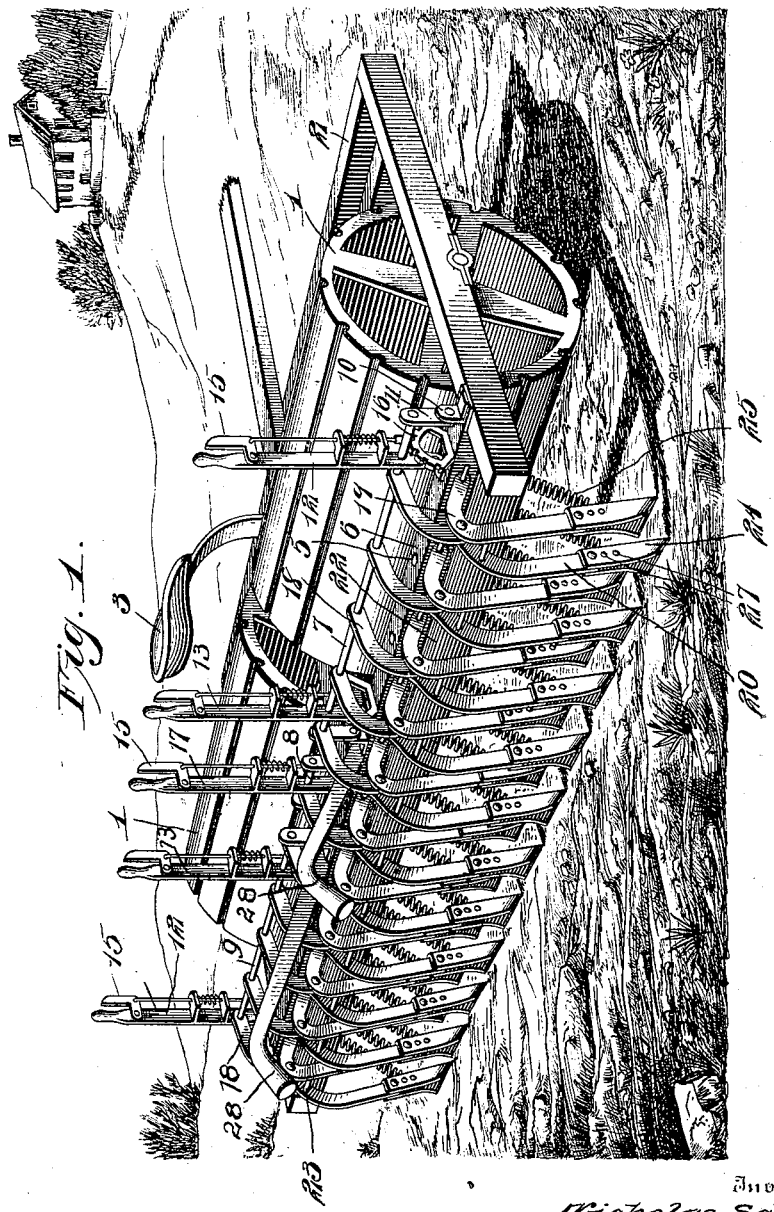
Figure 2:
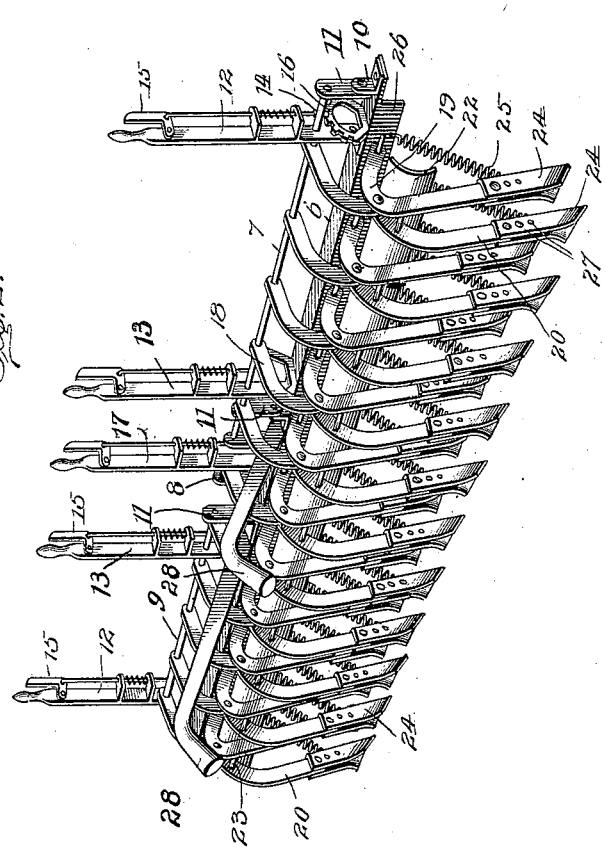
Figure 3:
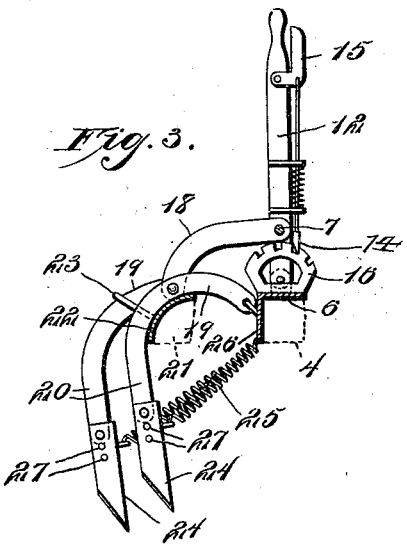
Figure 4:
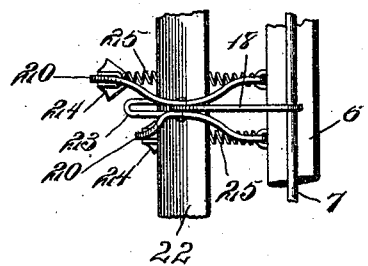
Figure 5:
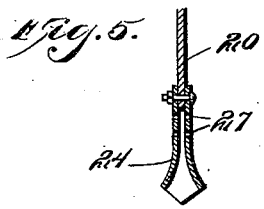

Figure 1 is a perspective view of the invention attached to a roller-frame. Fig. 2 is a perspective view thereof detached. Fig. 3 is a detail view of a harrow attachment detached. Fig. 4 is a plan view thereof, and Fig. 5 is a detail view of an adjustable shovel.

Referring to the drawings by numerals of reference, 1 1 is a double roller of the construction shown and described in my former patent hereinbefore referred to, and the same is mounted within a rectangular frame 2, having a seat 3 suitably supported thereon. Said frame is provided at its rear end with cross-beams, to the inner one 4 of which is adapted to be detachably secured by means of bolts 5 a preferably L-shaped metallic cross-strip 6, to which are secured the harrow attachments of the device. Upon said cross-strip are mounted adjusting-bars 7, 8, and 9, which have bearing at their ends in ears 10 through the medium of end links 11, pivoted to said ears. The bars 7 and 9 are connected to opposite end sets of teeth and the bar 8 to an intermediate set of teeth. It is preferred that the end sets each include ten teeth and the intermediate set two teeth, though this number may be varied at will. The bars 7 and 9 are each shiftable by means of two adjusting-levers 12 and 13, each having in connection therewith a spring-actuated dog 14, operated by an upper supplemental lever 15 and connecting with toothed segments 16, relatively positioned to the lower ends thereof. The bar 8 of the middle section is likewise shiftable by means of a supplemental adjusting-lever 17, operated in a similar manner. By employing two levers 12 and 13 upon each long bar 7 and 9 twisting thereof is prevented and all of the teeth suspended therefrom are raised together. These levers 12 and 13 and 17 are within reach of the operator occupying the seat 3.

To the bars 7, 8, and 9 are secured links 18, which curve downwardly at their lower ends and pass between the upper curved portions 19 of teeth 20. Each link is attached to a pair of teeth, and the said upper curved portions 19 of the tooth in advance of their point of attachment to the said links are spread or diverge and are movably attached to the cross-strip 6 in any suitable manner. This divergent arrangement strengthens the teeth and facilitates their securement to the said cross-strip in a convenient manner. Detachably secured to a rear beam 21 of the frame of the combined roller and harrow is a plate 22, extending transversely of the frame of the device and provided with guides 23, which extend between each pair of teeth and guide the latter in their adjustment and also hold them in place and prevent lateral movement of the same. One tooth of each pair is farther to the rear than the other and the entire series of teeth are arranged to establish a transverse alinement of the advance and rear teeth.

To the lower ends of the teeth 20 are pivotally attached shovel-points 24, provided with slightly-flared portions and each preferably constructed of a single piece of material bent at its upper end to embrace the lower part of each tooth. The purpose of pivoting the shovel-points is to allow them to ride over rigid obstructions with which they may come in contact during their movement over the ground-surface, and in this operation they freely swing rearwardly against the resilient action of springs 25, which are attached to the front portions of each and also to the adjacent depending portion 26 of the L-shaped cross-strip 6. After passing the obstruction the shovel-points are returned to normal position by the said springs and the latter are stiff enough to sustain the shovel-points in operative position under all ordinary circumstances. By this means breaking of the teeth is obviated and the difficulties ordinarily encountered in spring-teeth are overcome. Each of the points 24 is preferably provided with two or more perforations 27, whereby they may be adjusted vertically upon the teeth, as is obvious. Handles 28 are secured to the cross-strip 6, as shown, near the ends thereof, whereby the device may be readily guided, as in rolling and harrowing the ground.

The operation of the device is similar to that described in my patent heretofore mentioned. By my improved construction it will be seen that all of the harrow attachments are secured to a cross-strip 6, which may be detachably fastened to the frame of the roller by two or more bolts or in other suitable manner, thereby permitting the same to be detached and obviating the necessity of removing each part separately, as in the construction covered by my former patent. By providing the handles 28 the device may, as before stated, be readily guided.

While I have shown and described the preferred form of my attachment, I do not limit myself thereto, as I am aware that modifications may be made in the construction thereof without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. In a combined roller and harrow, the combination of a frame, a two-part roller mounted therein, an independently-adjustable series of teeth in rear of said roller, detachably secured to the frame and composed of united pairs, one tooth of each pair being in advance of the other and laterally projecting, the advance and rear teeth of the entire number being in transverse alinement respectively, and independent adjusting-bars connected with said teeth.

2. In a combined roller and harrow, the combination of a frame, a roller mounted therein, a strip detachably secured to the frame in the rear of the rollers, and a series of teeth mounted upon said strip, and having spring-actuated pivot-points thereon, and independent adjusting-bars connecting with said teeth.

3. A harrow attachment for a roller-frame comprising a cross-strip, independent adjusting-bars secured thereto, adjusting-levers connected to said bars, independent series of teeth movably attached to the strip, and links connecting each pair of teeth with the said bars.

4. In a combined roller and harrow, the combination with a frame, of a transverse strip detachably secured thereto, independent series of adjustable teeth mounted on said strip, handles secured thereto, and pivoted and adjustable points secured to said teeth.

5. The combination with a roller-frame, of an L-shaped strip detachably secured thereto, independent adjusting-bars on the rear part of the frame, an adjusting-lever connected to the said connecting-bars near each end thereof, an adjusting-lever connected to the center of the middle adjusting-bar, independent series of teeth movably attached to the cross-strip, links connecting each pair of teeth with said bars, and shovel-points adjustably and pivotally secured to the lower ends of said teeth.

In testimony whereof I affix my signature in presence of two witnesses.

NICHOLAS SCHWARTZ.

Witnesses:
WM. S. HOLMAN,
MICHAEL GIEGOLDT, Sr.